Aug. 13, 1929.   C. H. BRASELTON   1,724,178
LIQUID ELEVATING SYSTEM
Filed June 17, 1922    4 Sheets-Sheet 1
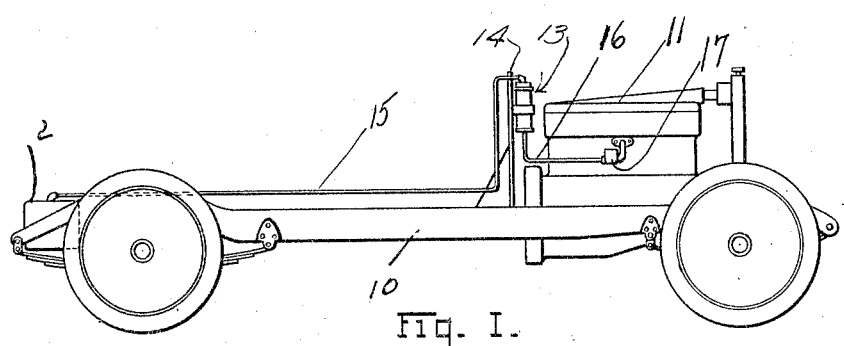
Fig. I.
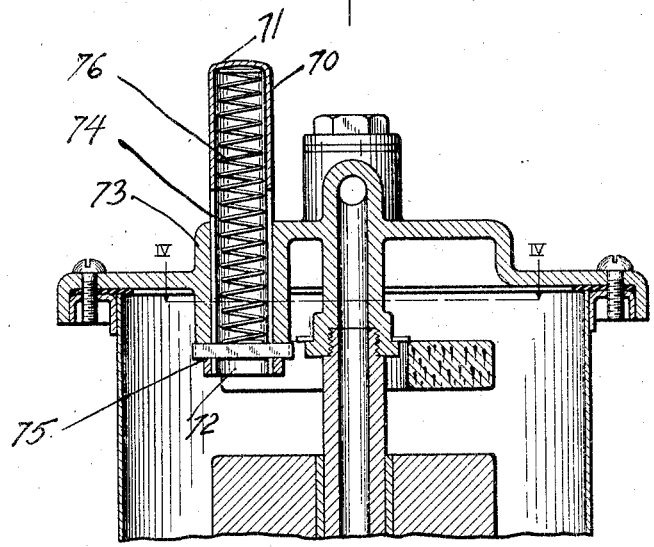
Fig. III.
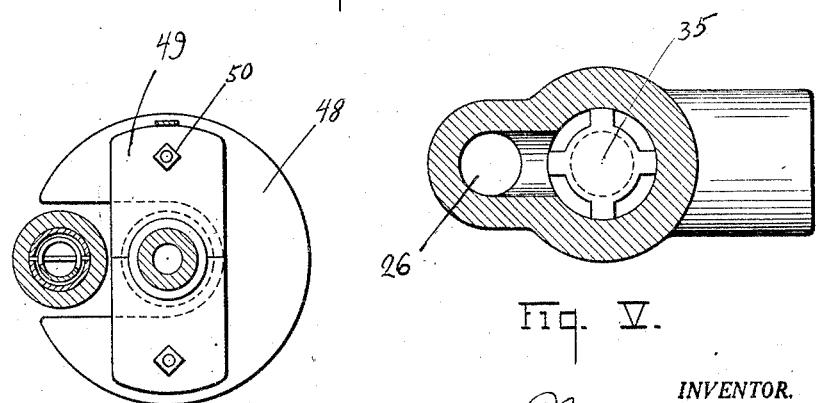
Fig. IV.    Fig. V.
INVENTOR.
Chester H. Braselton

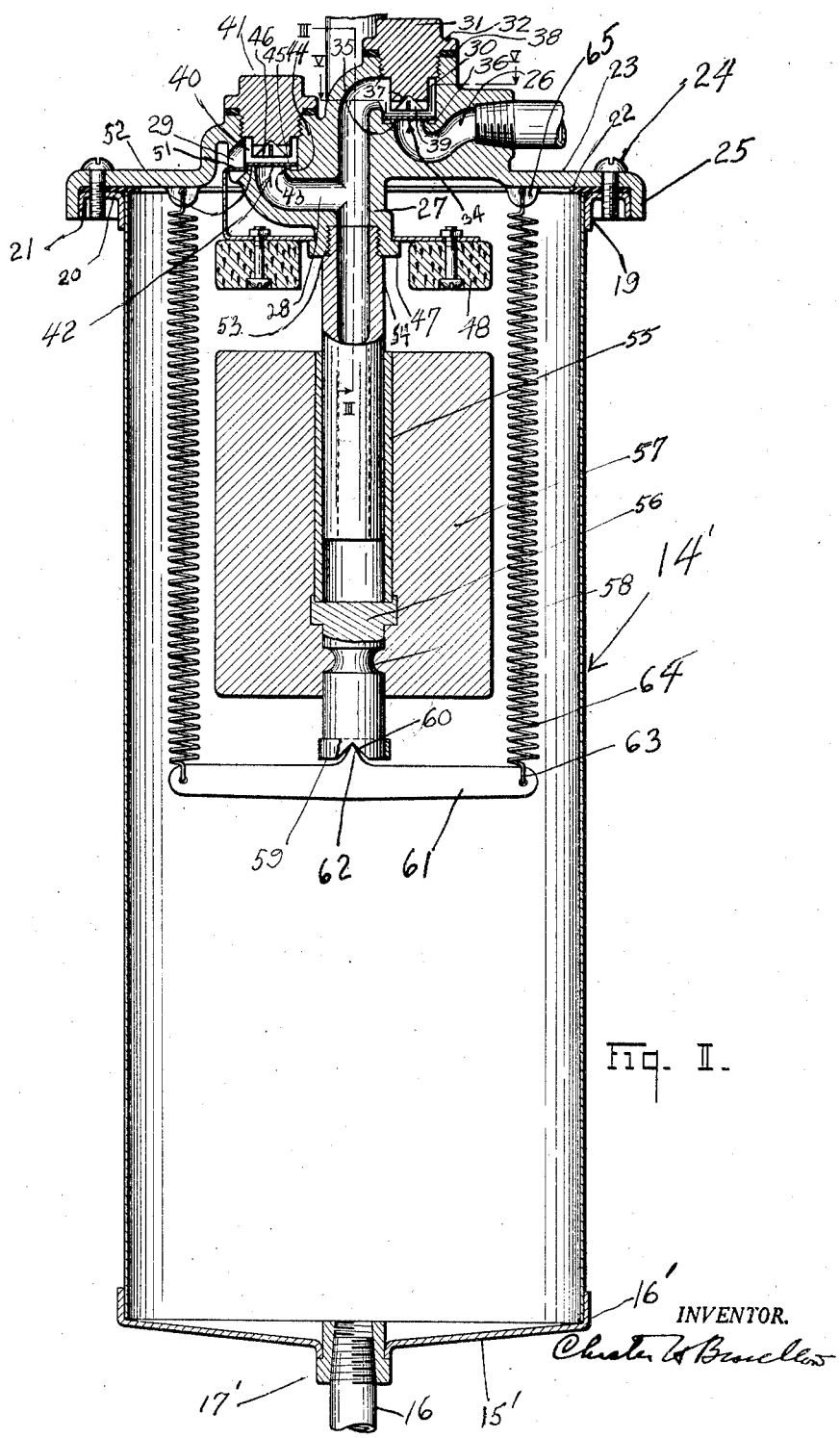
Fig. II.

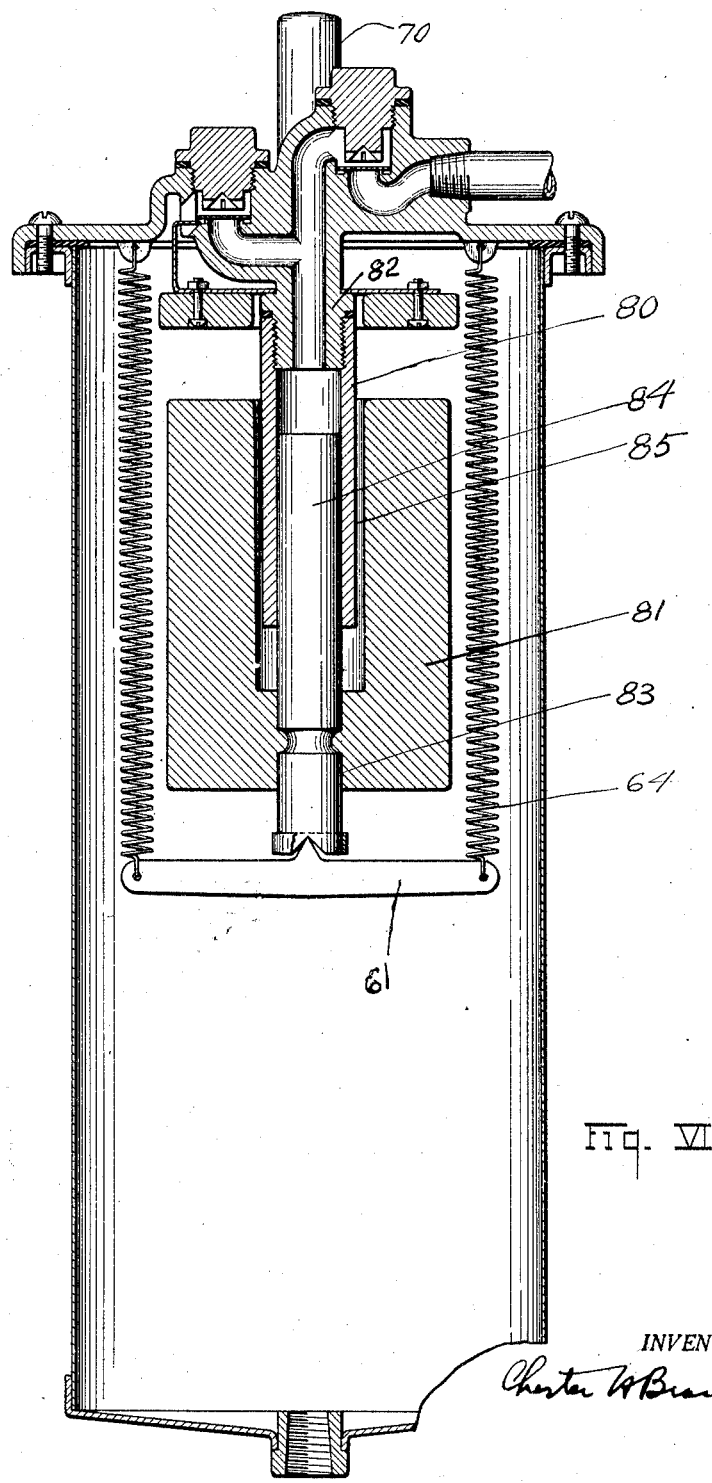

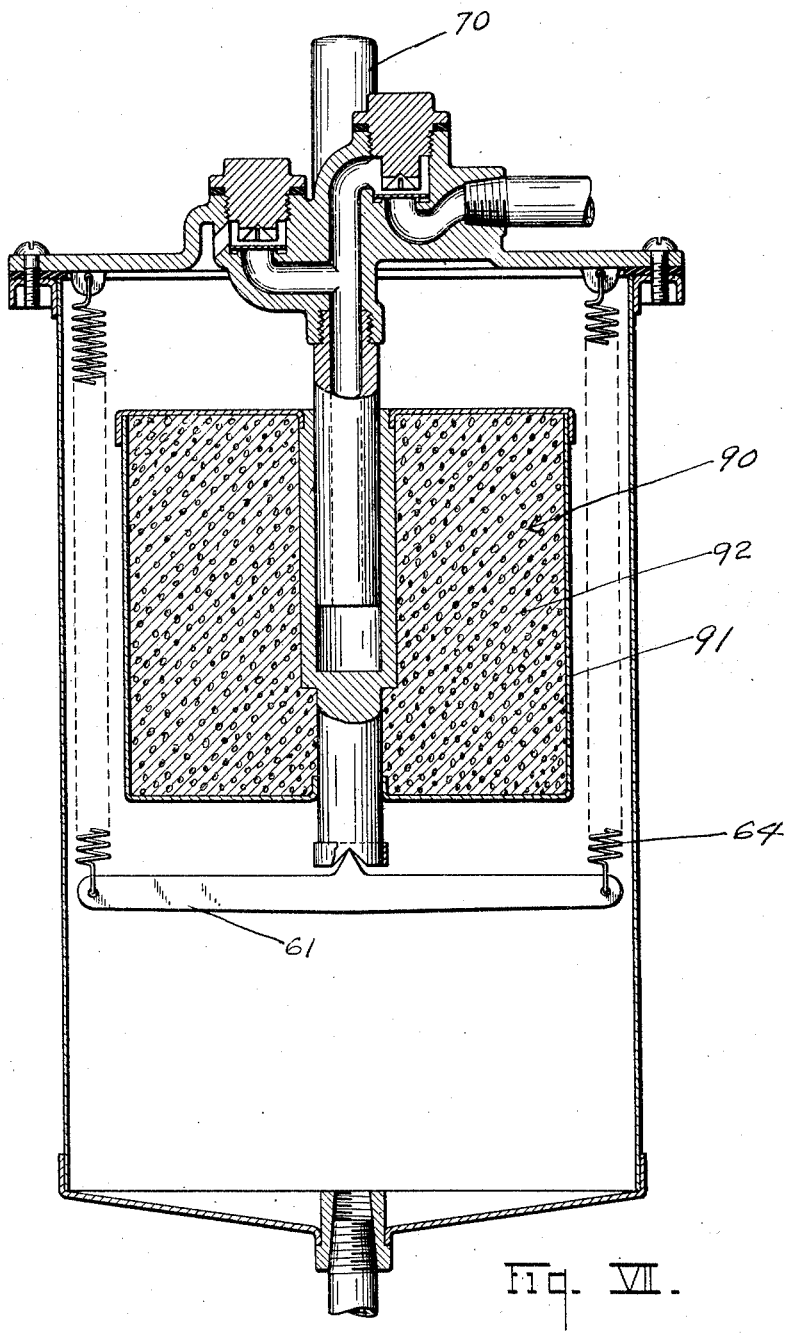

Patented Aug. 13, 1929.

1,724,178

UNITED STATES PATENT OFFICE.

CHESTER H. BRASELTON, OF NEW YORK, N. Y.

LIQUID-ELEVATING SYSTEM.

Application filed June 17, 1922. Serial No. 569,151.

This invention relates to liquid elevating systems having particular applicability to automotive vehicles wherein liquid fuel is elevated from a main reservoir to an auxiliary high level reservoir whence it is fed by gravity to the distributing apparatus.

The apparatus is a modification of that shown in my co-pending application entitled "Inertia operated pump mechanism" Serial No. 566,379, filed June 6, 1922, and in the joint application of Fred. B. MacLaren and myself entitled "Vibration operated pumps," Serial No. 532,719, filed Jan. 30, 1922, and involves the utilization of a pump adapted to be enclosed in the auxiliary tank, and operated by a weighted piston dependent for movement upon the vibration of the containing tank.

Movement of the tank is contingent upon the movement of the support to which it is attached and inasmuch as an automotive vehicle is subjected to constant vibration when moving along a road bed, forces are constantly at work tending to operate the pump while the automobile is in motion.

One of the principal objects of this invention is to provide a combined tank and pump mechanism in which the entire pump apparatus is supported within the tank from the top or cap thereof in distinction to an arrangement in which the pump is supported from a bearing attached to the base and cap combined. One of the specific advantages of this arrangement lies in the fact that there is no possibility of the relatively movable mechanism of the pump being warped or twisted because of strain between the upper and lower parts of the tank itself, and thus hindering the free moving action of the apparatus becauses of the resulting additional friction.

Another important object of the invention is to centralize as far as possible the entry and exit conduit and valves of the pump in one casting or plate from which the pump mechanism may be suspended so that the whole pump structure may be inserted or removed as a complete unit for inspection or repair. By this arrangement, also, provision is made for a single and adequate feeding construction whereby leakage about the movable parts of the pump is prevented, thus enabling the pump to be operated at its highest possible efficiency. It is an object also of the invention to diminish to a minimum the amount of manual pumping necessary when about to start the engine, if found that the auxiliary tank is empty. This result is accomplished by so designing and positioning the pump chamber that it is at all times practically filled with the liquid which is to be pumped. Various other objects reside in the utilization of a simplified float controlled means for stopping the pumping action when the supply of liquid in the auxiliary tank has reached a predetermined level; in the provision of means for utilizing more than one spring in the operation of the pumping mechanism; and in the other various simplified details of construction and methods of manufacture, which will become apparent in the description of various embodiments of my invention hereinafter detailed in the specification and illustrated in the accompanying drawings, in which Figure I is a diagrammatic elevation of an automobile with the invention applied thereto;

Figure II is a sectional elevation showing the details of the pumping mechanism;

Figure III is a detail of the upper portion of the pump structure taken on a line 3—3 of Figure II;

Figure IV is a detailed section taken on line 4—4 of Figure III;

Figure V is a detail through the inlet valve taken on line 5—5 of Figure II; and Figures VI and VII are sectional elevations of modified cap constructions.

Referring particularly to Figure I, there is shown an automobile body 10 of conventional construction having an engine 11, and a rear main reservoir or tank 12 in which the main supply of gasoline or liquid fuel is designed to be placed. The combined tank and pumping mechanism 13 is positioned on the dash board 14 of the automobile and is connected on the one hand by means of a pipe 15 to the main reservoir, and on the other hand by the pipe 16 to the carbureter 17 of the engine whence the fuel is led into the engine through an intake manifold in the usual way.

One embodiment of the combined auxiliary tank and pump mechanism is shown in Figure II in cross section. There is disclosed in this figure a main cylindrical section 14' to the base of which is fastened an end plate 15', having an annular upturned flange 16' adapted to be soldered or otherwise fixed to the lower end of the cylinder 14'. The center of the end plate 15' is apertured to receive an internally threaded bushing 17', to which the carburetor pipe 16 is adapted to be connected. Fixed to the outer, upper edge of the cylinder 14' is a ring 19 having radially out-turned portions 20 and an outer down-turned edge 21. Resting upon the radial portion 21 of this ring is an annular gasket 22 upon which rests the periphery of the upper cap 23, the annular gasket 22 being clamped or fastened thereto by means of detachable machine screws 24. The extreme outer edge of the upper cap is downturned as at 25, fitting against the downturned portion 21 of the ring 19, thereby securing the gasket 22 properly positioned and keeping the cap from any lateral displacement and also providing for the maintenance of a liquid tight joint.

The upper cap 23 is preferably in the form of a casting having a central portion protruding upwardly at one side of which there is an inlet opening for a conduit 26 which extends radially inwardly to the center of the cap and then downwardly through a projection 27 integral with the base of the cap. In the cap also there is a branch conduit 28 leading from the main conduit 26, the branch conduit 28 having an exit opening 29 into the interior of the tank 12. Access may be had to the main conduit 26 through a cap opening 30 in which a plug 31 is normally positioned. This plug 31 is screw threaded in position and is formed at its periphery with a flange 32 beneath which a gasket 33, adapted to prevent leakage of liquid and air into the pump conduit chamber, is positioned. Directly below the base of the plug 31 is the seat for the inlet valve 34 which is formed in the shape of an annular projection 35 of the conduit 26 surrounded by a depressed channel 36 to give a minimum bearing on the valve plate 37, the valve plate 37 being adapted to rest directly upon the valve seat 35 and to have a limited range of movement upward against a projection 39 formed on the base of the plug 31, which projection is also formed so as to give a minimum bearing upon the valve plate 37 and thereby reduce the cohesive action when the valve plate 37 is in contact therewith, permitting the same to readily return to place through the action of gravity. Similarly, access may be had to the exit conduit 28 through a threaded aperture 40 in which a plug 41 is normally positioned and is removable to obtain access to the exit valve 42. This valve 42 is similar in construction to that of the inlet valve 34, there being an inner annular projection 43 around the conduit 28 with a channel 44 extending around said projection, a sheet metal valve plate 45 resting upon the inner projecting portion 43, and a limiting stop 46 integral with the base of the plug 41 for limiting the upward movement of the valve 42.

The terminal of the downwardly projecting portion 27 of the upper cap 23 is formed with an annular flange 47 upon which rests a U-shaped float 48. Connection between this float and flange is effected by means of a sheet metal plate 49 secured to the float 48 by means of bolts 50. One end of this plate 47 is extended beyond the float 48 and upwardly and inwardly, the end 51 of the extension terminating in a notch 52 directly below the outlet valve plate 45 so that when the float 48 is raised by the accumulation of liquid within the tank or tipped to a small degree, the internally projecting tip or finger 51 contacts with the valve 42 lifting the same off the seat 43 and thereby disabling the pumping action of the mechanism. The general shape or construction of the float 48 is clearly brought out in Figures II and IV.

By means of a threaded connection 53, there is fastened to the projection 27 at the base of the upper cap 23 a hollow tubing 54, this forming the piston or plunger element of the pumping mechanism. This piston 54 is adapted to have axially sliding movement in the cylinder 55, the base of which rests upon a block 56 and the side of which is completely enclosed in a weighted mass 57. The block 56 is cast with the weighted mass 57 and connection therewith is more firmly secured by means of an annular channel 58 about the block 56 adapted to prevent any lateral or any axial displacement of the two parts.

The block extends below the base of the weighted mass 57 and the lower face 59 thereof is grooved in the form of a V 60 and in this groove a cross bar 61 bearing an upwardly projecting V-shaped bearing 62 possessing a greater angularity than the groove 60 in the base of the block 56 is adapted to have a pivotal contact. The ends of the cross bar are apertured to receive the terminals 63 of coil springs 64, the upper ends of which are fastened to downwardly projecting lugs 65 integral with the base of the cover cap 23.

Mechanism to manually manipulate the weighted mass from a point external to the casing is provided in a hollow tubing 70 having a closed top 71 and an open bottom 72 and adapted to have an up and down movement in a cylindrical vertical bearing 73 formed or cast into the top of the upper cap 23 above the mass 57. The sides of the tubing 70 are cut axially to form parallel opposite slots 74, and in these slots a cross bar 75 fitted adjacent the base of the bearing portion, is adapted to have a movement. This cross bar also forms a base or support for a coil spring 76, the upper end of which contacts against the inner top of the tubing so that through the expansion of the spring the tubing is normally maintained at its uppermost position. It is thus apparent that when pressure is applied to the upper closed portion 71 of the tubing, the same is moved downwardly against the resilient force of the interiorly placed spring until the lower end of the tubing contacts with the weighted mass 57, thereby moving the same against the tension of the spring and in this way the pump is manipulated to draw in liquid into the auxiliary tank until a sufficient supply is obtained for the starting of the engine. It is necessary, of course, only to use this manual pumping device 70 in such cases, as when the fuel has entirely drained out of the auxiliary tank and carburetor so that there is an insufficient supply to start the engine and move the automobile along the road.

As intimated in the description hereinbefore made and in the object of invention, the operation of the pumping mechanism is dependent upon the movement of the automotive vehicle either through the vibration caused by the engine itself when in motion or by the movement of the vehicle over a road bed with its variations in level, such movement imparting through the car frame and, consequently, to the casing of the auxiliary tank 13 a vibration or oscillation which occurs at irregular intervals, but continuously, this vibration causing an up and down movement of the weighted mass 57 within the interior of the tank. Inasmuch as the weight is yieldingly secured to the casing by means of the springs 64, there obviously results a relative displacement of the piston element and the cylinder element 55 which latter is attached to the weighted mass 57, whereupon the volume of the pumping chamber is varied and the accompanying compression and expansion induces the flow of liquid from the main tank through the inlet valve 34 on a downward movement of the mass, followed by a closure of the inlet valve and opening of the outlet valve 42 to the interior of the tank upon an upward movement of the weighted mass, this intake and expulsion occurring constantly while the car is in motion and vibration. When the liquid in the auxiliary tank rises to a level where a contact with the float 48 is made, the valve 45 is lifted off its seat permitting the free movement of gases into the pump chamber. Thereupon the pumping action of the pump is stopped and there is a cessation of the inflow of liquid to the main tank. This particular state will continue until the engine has used sufficient liquid to permit the valve to reseat itself, whereupon the pumping action will recommence.

It is of importance to know that at the time when the valve is unseated, the interior of the pump including the conduit 33 is filled with liquid, so that when the pumping is again resumed, there is a comparatively small volume of pumping space necessary to be refilled before the normal flow of liquid is resumed. Moreover, should the liquid either accidentally or through some specific usage drain out of the base of the auxiliary tank and carburetor, there will always be a certain amount of liquid within the pump chamber inasmuch as the base of the cylinder is closed. Because of this arrangement, the connection between the piston and cylinder is practically gas tight, the liquid forming a seal and thus greatly increasing the efficiency of operation of the pump.

It is also of importance to note that because of the variation in the angle between the V-shaped bearing 60 in the base of the block 56 and the projection 62 from the top of the connecting bar 61 between the springs, any variation of the tension of the springs 64, whether accidental or through ordinary wear, may be taken care of through an automatic pivotal motion of the bar in its point of contact, thus preventing a warping tendency upon the weighted mass tending to increase the friction of the cylinder upon the piston.

In the modification shown in Figure VI, the cylinder 80, instead of being combined with the weighted mass 81 and instead of being movable, is fastened at one end by means of screw threads in the central lower projection 82 from the base of the cap and the lower block connector 83 is extended in the form of a piston element 84 in the interior of the cylinder, this arrangement placing the pump chamber adjacent the top, instead of adjacent the base of the weighted mass 81. In order to take care of this modified construction and at the same time reduce to a minimum the friction possible with such an arrangement, the interior 85 of the weighted mass adjacent the cylinder is cut away so that there is no contact therewith and the exterior of the cylinder, this construction providing also a cup shaped receptacle for a residue of liquid which may serve as a priming fluid or liquid seal for the movable pumping element of the apparatus.

In Figure VII of the drawing is shown an arrangement similar to that of Figure II with the exception that the float mechanism is entirely removed and as a substitute for the disabling action of the float in connection with the outlet valve, the weighted mass 90 is made of material having such a density that when the liquid has risen to a given elevation, the buoyant force of the liquid will be sufficient to arrest the pumping action of the same, thereby diminishing the inflow of liquid to a point where there is an excess of outflow to the carburetor over that received by the movement of the pump. This construction may take the form of a hollow container 91 made of sheet metal in which is inserted concrete 92 or any other material which will give the required relative density as regards the liquid fuel.

It is, of course, evident that various other detailed modification may be made involving the fundamental ideas of the embodiment herein disclosed. All such modifications, however, come within the scope of the present invention as will be apparent from a consideration of the claims hereto appended.

I claim as my invention:

1. In a fuel supply system, the combination of a casing, a plate secured to one end of said casing, a plunger element suspended from said plate, a cylinder yieldingly suspended from said plate, such cylinder and piston being adapted to have axial movement relative to each other whereby liquid is pumped into said casing.

2. In a liquid supply system, the combination of a casing, a cap at one end of said casing, a conduit within said cap adapted to form a connection from the exterior of the casing to the interior thereof, inlet and outlet valves positioned within said conduit, a piston element attached to the base of said cap, a cylinder carried by said cap and having axial movement relative to said piston member, and float controlled means adapted to disable said pumping mechanism when the flow of liquid in the casing has reached a predetermined level.

3. In a liquid supply system, the combination of a casing, a plate secured to one end of said casing, a weighted mass yieldingly suspended from the interior of said plate, a cylinder secured to said mass and adapted to be movable therewith, a plunger within said cylinder and fixed to said plate whereby movement of said mass will induce pumping action within said cylinder, a source of liquid supply, and a conduit connecting said supply source and the cylinder of said pump.

4. In a liquid supply system, the combination of a casing; an end support; pumping mechanism secured to said support only; and means yieldingly secured to the support for transmitting operating energy from the support to the pumping mechanism.

5. In a liquid supply system, the combination of a casing; an end support; pumping mechanism secured to said support; and means yieldingly secured to the support for transmitting operating energy from the support to the pumping mechanism, said means having an automatically adjustable connection with said mechanism.

6. In a liquid supply system, the combination of a casing; an end plate secured to said casing; a pump secured to the end plate; means yieldably supported from said end plate for transmitting operating energy from the plate to the pump; and float operated means secured to the end plate and adapted to disable the pump mechanism when the supply of liquid in the casing has reached a predetermined point.

7. In a liquid supply system, the combination of a casing having an end plate; a pumping element extending axially within said casing and supported by said end plate only; a cooperating pumping member slidable on said element and adapted by relative movement therewith to cause pumping action; a cross bar pivotally connected to the pumping member at its base; and springs fastened to the ends of said bar and to said end plate whereby the pumping member is yieldingly supported.

8. In a liquid supply mechanism, the combination of a casing; a conduit formed in the wall of said casing and having connection with the exterior and interior of the casing; a support vibrated pump carried by said end wall and including an outlet valve in the conduit permitting inflow of liquid into said casing; and float operated means adapted to hold open said outlet valve when the supply of liquid in the casing exceeds a predetermined level.

9. In a fuel supply system, the combination of a casing, a plate secured to said casing, and a support vibrated pumping mechanism contained entirely within said casing, supported entirely by said plate, and having no operative connection outside of said casing, said mechanism comprising two relatively movable members, one rigidly fixed to said plate and the other adapted to move solely by its own inertia when said plate is vibrated.

10. In a liquid supply system, the combination of a casing, an end plate positioned on said casing, a conduit formed in the end plate, a support vibrated pumping mechanism carried by said end plate, and inlet and outlet valves in said conduit, said valves being normally seated and adapted to be moved upwardly against gravity by the action of said pumping mechanism to cause a flow of liquid through said conduit.

11. In a pumping mechanism, the combination of a receptacle into which liquid is to be pumped, a cover for said receptacle, and a unitary member carried by said cover and having inlet and discharge passages and inlet and discharge valve chambers therein, said member being adapted to receive a hollow plunger forming a part of the pumping mechanism and communicating with said inlet and discharge passages.

12. In a system of the character indicated, a combination of an auxiliary tank, an inertia member located in said tank, a spring cooperating with said inertia member and a unitary die-cast pump valve assembly provided with inlet and discharge passages, inlet and outlet valves and a hollow stationary piston extending between said die-cast unit and said inertia mass, said hollow member being located between the inlet and outlet valves in said unit.

13. A pumping mechanism comprising a receptacle into which liquid is to be pumped, a cover for said receptacle and a unitary member carried by said cover and provided with inlet and discharge passages and inlet and discharge valve chambers, said valve chambers being closed by plugs removably inserted in said member, and said member being adapted to receive a hollow plunger forming part of the pumping mechanism and communicating with said inlet and discharge passages.

14. A pumping mechanism comprising a tank adapted to receive the liquid to be pumped, a cover for said tank and a die cast member carried by said cover and having inlet and discharge valve chambers located therein, and a passage between said valve chambers forming part of a pumping chamber, said member being adapted to receive a hollow plunger forming part of the mechanism and having an axial bore therein communicating with said passage and forming a part of the pump chamber.

15. An inertia pumping mechanism comprising in combination a tank, an inertia pump actuating mass of relatively great buoyancy arranged in said tank, a spring cooperating therewith, and a pumping mechanism comprising a unitary self-contained member having an inlet, an outlet, and inlet and outlet valve chambers and a hollow stationary piston on which said mass moves in operation.

16. An inertia pumping mechanism comprising in combination, a tank, an inertia pump actuating mass of relatively great buoyancy arranged in said tank, a spring cooperating therewith, and a pumping mechanism comprising a unitary self-contained member having an inlet, an outlet, and inlet and outlet valve chambers, a hollow stationary piston on which said mass moves in operation, and means associated with said mechanism for manually actuating said pumping mechanism.

17. A device of the class described comprising a tank, a resiliently supported weight in said tank having a pump chamber formed therein, a cover for said tank provided with inlet and outlet passages and inlet and outlet valves, and a plunger carried by said cover working in the pump chamber and having an axial passage therethrough communicating with said inlet and outlet passages.

18. A device of the class described comprising a tank, a weight supported in said tank and having a pump chamber formed therein, a cover secured to the top of said tank, a member carried by said cover and provided with inlet and discharge passages and inlet and discharge valves, a plunger inserted in said member and working in the pump chamber of said weight, said plunger having an axial bore therethrough, and said member having a passage connecting with said bore and communicating with the inlet and outlet valves.

19. In a pumping mechanism, the combination of a receptacle into which liquid is to be pumped; a cover for said receptacle; a unitary member carried by said cover and having inlet and discharge conduits and inlet and discharge valve chambers therein; and a plunger forming a part of the pumping mechanism mounted on said member and communicating with said inlet and discharge passages.

20. A pumping mechanism comprising a tank adapted to receive the liquid to be pumped; a cover for said tank; a die-cast member carried by the cover and having inlet and discharge valve chambers located therein; and a plunger mounted in a passage formed in the die-cast member between said valve members.

In testimony whereof, I affix my signature.

CHESTER H. BRASELTON.